United States Patent [19]
McKeever

[11] Patent Number: 4,996,832
[45] Date of Patent: Mar. 5, 1991

[54] SIDE GUARD FOR ROTARY LAWN MOWER

[76] Inventor: Leslie W. McKeever, 3004 W. Glen, Peoria, Ill. 61615

[21] Appl. No.: 539,266

[22] Filed: Jun. 18, 1990

[51] Int. Cl.⁵ .................. A01D 34/63; A01D 67/00; A01D 75/00
[52] U.S. Cl. .................. 56/320.1; 56/17.4; 56/255; 56/DIG. 20; 56/DIG. 24
[58] Field of Search .............. 56/320.1, 320.2, 17.4, 56/17.5, 255, DIG. 20, DIG. 24; 280/304.3, 160, 770; 293/128, 130, 153

[56] References Cited
U.S. PATENT DOCUMENTS

| | | | |
|---|---|---|---|
| 1,581,349 | 4/1926 | Kaufmann et al. | 293/130 |
| 3,537,720 | 11/1970 | Irgens | 56/320.2 X |
| 3,909,053 | 9/1975 | Koch | 280/770 X |
| 4,172,351 | 10/1979 | Scanland | 56/320.1 |
| 4,300,334 | 11/1981 | Hines | 56/320.1 X |
| 4,493,502 | 1/1985 | Campbell, Jr. | 293/128 |
| 4,672,799 | 6/1987 | Parish | 56/320.1 X |
| 4,903,465 | 2/1990 | Hughes | 56/320.1 X |

Primary Examiner—Stephen J. Novosad
Attorney, Agent, or Firm—Henderson & Sturm

[57] ABSTRACT

A rotary mower is provided with a side guard preferably along the left side of the housing and extending fore-and-aft to the outboard sides of the left-hand front and rear wheels at about axle height for the purpose of protecting the mower against obstacles at that side. The guard is extended in J fashion at its front and rear ends to extend around the front of the front wheel and in back of the rear wheel and each J portion has a short leg for affixation to existing parts of the mower, such as the housing, front and rear axles and the like. The guard is adjustable fore-and-aft to compensate for differences in spacing of the front and rear axles.

6 Claims, 2 Drawing Sheets

SIDE GUARD FOR ROTARY LAWN MOWER

BACKGROUND AND SUMMARY OF THE INVENTION

Side guards for rotary lawn mowers are known in the art, a typical patented design being disclosed in the U.S. Pat. No. 4,172,351 to Scanland. In the prior art, the guards are complicated, difficult to attach and mostly do not lend themselves to different styles of mower, especially as to longitudinal adjustment to compensate for differences in fore-and-aft wheel spacing. Other structures do not "loop" around the front and rear wheels in protective fashion.

The basic feature of the present invention is to provide an improved guard with longitudinal adjustability, simple mounting means and low-cost, light-weight design. Another feature is to utilize inboard portions of the mower as attaching points, yielding the advantage that front and rear portions of the guard serve as "bumpers" for the front and rear wheels. The front wheel is especially guarded because of its leading position in the normal mowing operation. Further objects and features will appear as the disclosure progresses in conjunction with the accompanying drawing.

DETAILED DESCRIPTION OF A PREFERRED EMBODIMENT OF THE INVENTION

Figure 1:
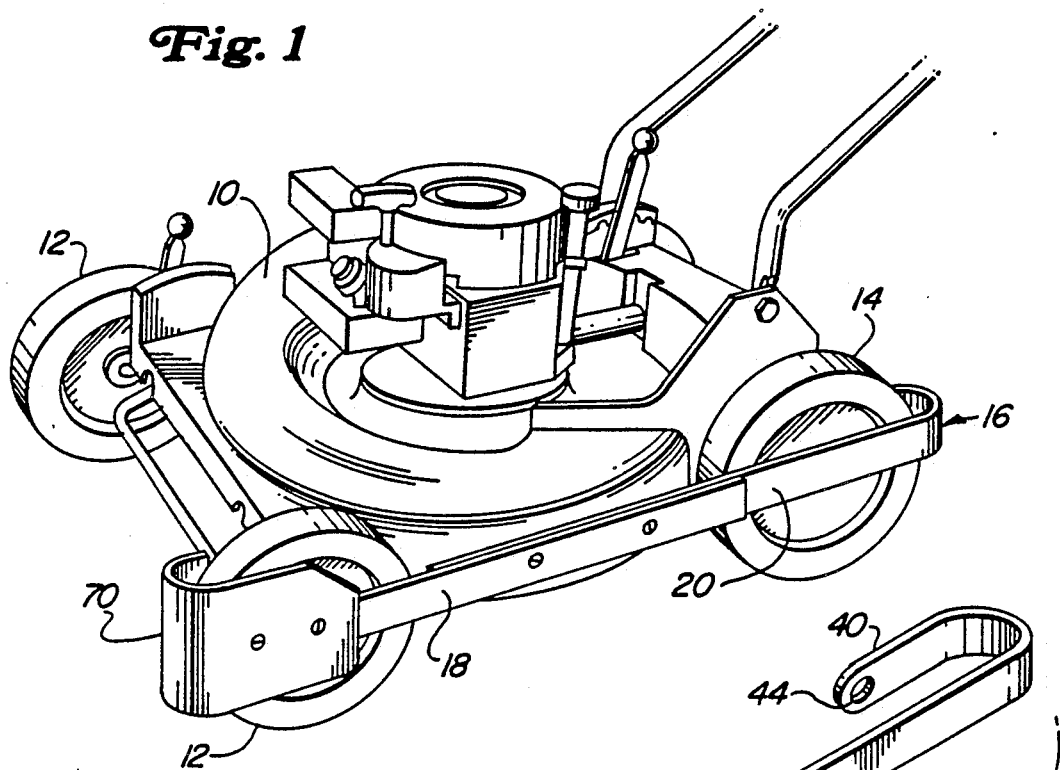
FIG. 1 is a perspective of a typical rotary lawn mower with the guard in place.

FIG. 1 illustrates a typical rotary lawn mower having a housing or body 10 carried on front wheels 12 and rear wheels 14 (only one of which appears in the view). The numeral 16 designates the improved guard in its entirety as mounted on the mower via certain mower components to presently appear. As previously stated, the guard is designed for attachment at the left side of the mower, since rotary mowers typically discharge to the right. Hence, the "close cutting" operations are normally performed at the left side of the mower and the mower and its user are therefore more apt to encounter obstacles at the left side, e.g., fences, buildings and the like.

Figure 2:
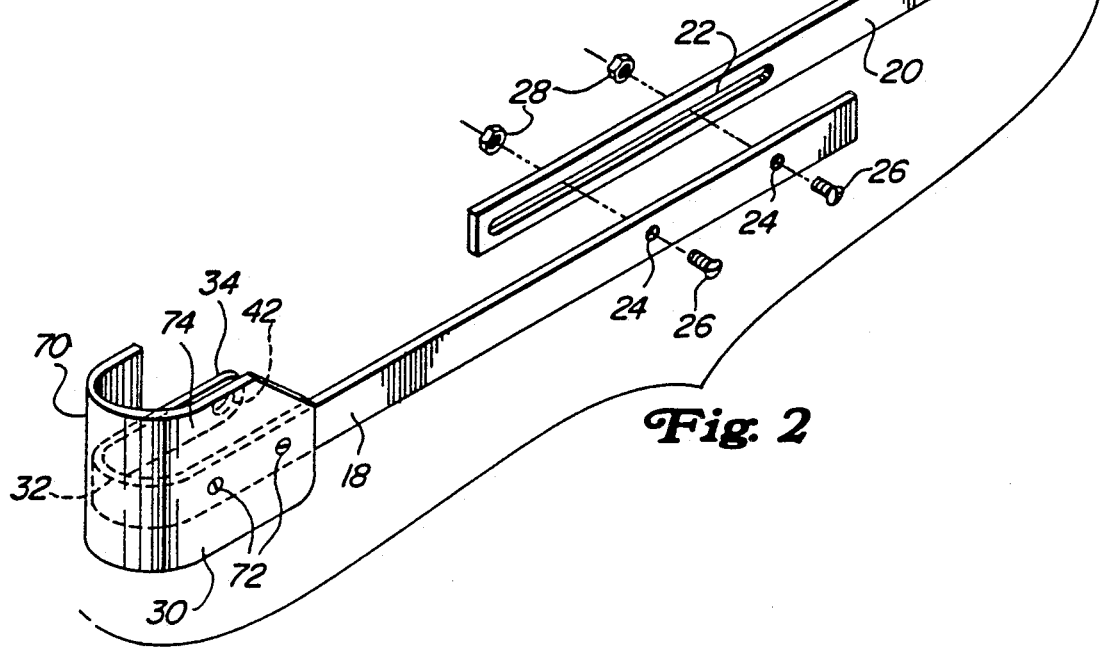
FIG. 2 is an enlarged, exploded perspective of the guard attachment per se.

As seen in FIG. 1, the guard is elongated fore-and-aft so as to extend beyond the front and rear wheels FIG. 2 shows that the guard comprises front and rear elements or halves 18 and 20 which, when assembled, make up the elongated structure noted above. The two elements are relatively adjustable to compensate for differences in the fore-and-aft spacing or wheelbase of the front and rear wheels. For this purpose, the rear element or half 20 has an elongated fore-and-aft slot 22 and the front half has a pair of bores 24. Bolts 26 are passed through the holes and slot and receive nuts 28 at the inboard side of the attachment. The bolts are preferably round-headed so as to avoid snagging on objects, bushes, etc., during mowing operation. Obviously, the nuts and bolts may be loosened and re-tightened to achieve lengthwise adjustment of the attachment to fit different mowers or to accommodate a mower when wheel spacing changes with height adjustment, a not uncommon occurrence in the typical mower, since most adjustments involve wheel mountings on crank arms.

The front half 18 has a forward end 30 configured as a J having a curved, smooth bight 32 and an integral short, rearwardly extending inner leg 34. The rear half is generally symmetrically formed with a rear end 36 provided with a smooth bight 38 and an integral forwardly extending short leg 40. When the attachment is mounted on the mower, the front bight "loops" around the front of the front wheel and serves as a bumper and the rear bight "loops" around and provides a bumper for the rear of the rear wheel during reverse operation. The inboard front leg has an opening 42 therein and the rear inboard leg is similarly provided with an opening 44 These are used in mounting the guard. Lengthwise adjustment of the guard may be achieved before or during mounting of the guard on the mower. The overlapped parts of the guard in the slot and bolt area where the guard is straight give the guard a major, side-protecting portion terminated at opposite ends by the bights.

In a typical mounting situation, the front wheel and its axle 46 are removed from an adjusting arm or crank 48 (FIGS. 3 and 4), the inner end of the axle being threaded at 50 for screw-threading into a tapped bore 52 in the arm 48. The opening 42 in the leg is alined with the tapped bore and the axle and wheel replaced, a shoulder 54 on the axle engaging and securing the short front leg 34. In the case of manually-propelled mowers, the rear wheel 14 may be mounted via a short axle 56 on an adjustable rear arm 58 and the type of mounting just described for the front mounting may be used at the rear; i.e., removing and replacing the rear wheel and axle and using the opening 44 in the short inboard rear leg 40.

Figure 6:
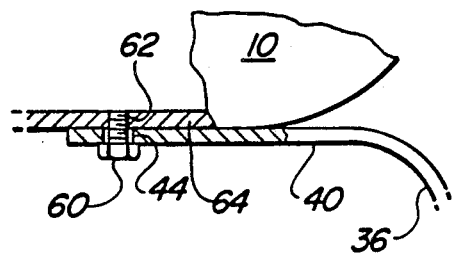
FIG. 6 is an enlarged view, partly in section, of an alternate mounting for the rear end of the attachment.

In many mowers of the self-propelled type, it may not be feasible to use the rear axle because of structural problems created by the drive mechanism. In those cases, the rear short arm 40 may be mounted directly to the mower housing as shown in FIG. 6, where a cap screw 60 is passed through the rear opening 44 and into a tapped bore 62 in a rear side part 64 of the mower housing 10. Usually, a cap screw will exist for some part of the drive or mower handle and this may be used for the rear mounting. In extreme cases, drilling and tapping of the housing may be required.

Figure 7:
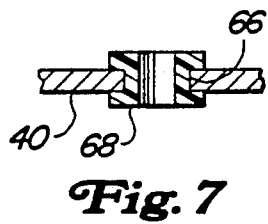

FIG. 7 shows a mounting where a rear axle may rotate as part of the self-propelling means. In this case, the hole in the rear short leg 40 is enlarged as at 66 for the purpose of receiving a low-friction bearing 68 of any suitable type, e.g., nylon or the like.

Figure 3:
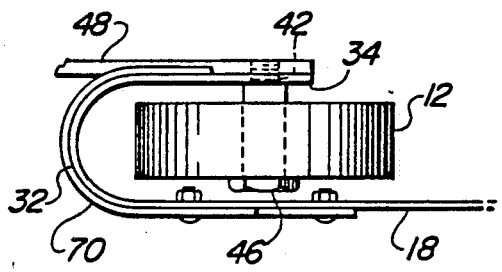
FIG. 3 is a plan of the front part of the attachment in relation to the mower front wheel.
Figure 5:
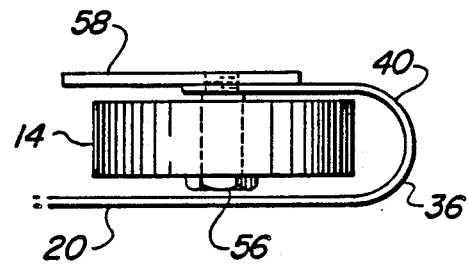
FIG. 5 is a plan of the rear part of the attachment in relation to a rear wheel of the mower.
Figure 4:
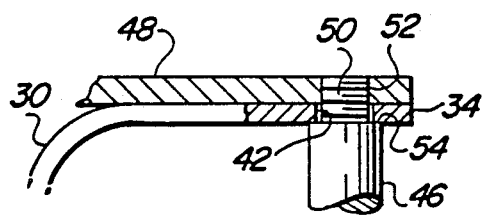
FIG. 4 is an enlarged fragmentary section of part of the structure of FIG. 3.

The front end of the basic guard is augmented by a flared member 70 relatively rigid material and of U-shaped section as seen in plan (FIG. 3). This member may be riveted at 72 (or otherwise affixed) to the front end of the front guard member half 18. The shape of the member 70 follows that of the front bight 32 and embraces the front wheel from the front and opposite sides and has a wall 74 of height to shield or protect a major portion of the outboard face of the front wheel from bushes and other objects, insuring smooth forward progress of the mower during normal operations.

Given a mower of suitable configuration, it is to be noted that the protective or guard structure can be inverted and used at the right side of the mower. One example could be the so-called mulching mower which has no lateral clippings discharge; or a rear-discharge mower with a rear bagger. These are only examples pertaining to the versatility of the invention.

As will have been seen from the foregoing, a simple, light-weight but sturdy attachment has been provided, featuring inboard mounting of the front and rear ends, which includes the bights "looping" about as bumpers the front and rear wheel as added protection and convenient mounting. Features in addition to those pointed out will become apparent to those versed in the art as well as alterations in the preferred structure disclosed, all without departure from the spirit and scope of the invention.

I claim:

1. A guard attachment for a rotary-type lawn mower carried on front and rear wheels and having a housing including wheel-mounting parts having axles for the wheels, comprising an elongated protective element adapted for mounting along one side of the mower and having a fore-and-aft major portion adapted for disposition closely spaced outboard of the wheel at that side of the mower, said major portion having a length greater than the distance between those wheels and further having front and rear terminal end portions integral with the major portion, the front end portion being of J-shape including a bight curving around the front of the adjacent front wheel and continuing as a relatively short rearwardly extending leg inboard of that front wheel, the rear end portion being likewise of J-shape including a bight curving around the rear of the adjacent rear wheel and continuing as a relatively short forwardly extending leg inboard of that rear wheel, said legs being adapted for affixation to respectively front and rear parts of the mower.

2. A guard attachment according to claim 1, in which the front and rear legs respectively have through openings for respectively receiving the front and rear axles.

3. A guard attachment according to claim 2, in which at least one of the legs includes a low-friction bearing in its opening.

4. A guard attachment according to claim 1, in which the elongated element includes provision for accommodating differences in fore-and-aft front and rear wheel spacing.

5. A guard attachment according to claim 4, in which the elongated element is made up of separate parts selectively adjustable lengthwise relative to each other for accommodating differences in fore-and-aft front and rear wheel spacing.

6. A guard attachment according to claim 1, including a shield of U shape as seen in plan and affixed to and configured according to the front bight in semi-embracing relation to the front wheel as respects the front and opposite sides of the wheel, said shield including an outboard upright wall of such height as to protect at least a major portion of the outboard face of the front wheel.

* * * * *